UNITED STATES PATENT OFFICE.

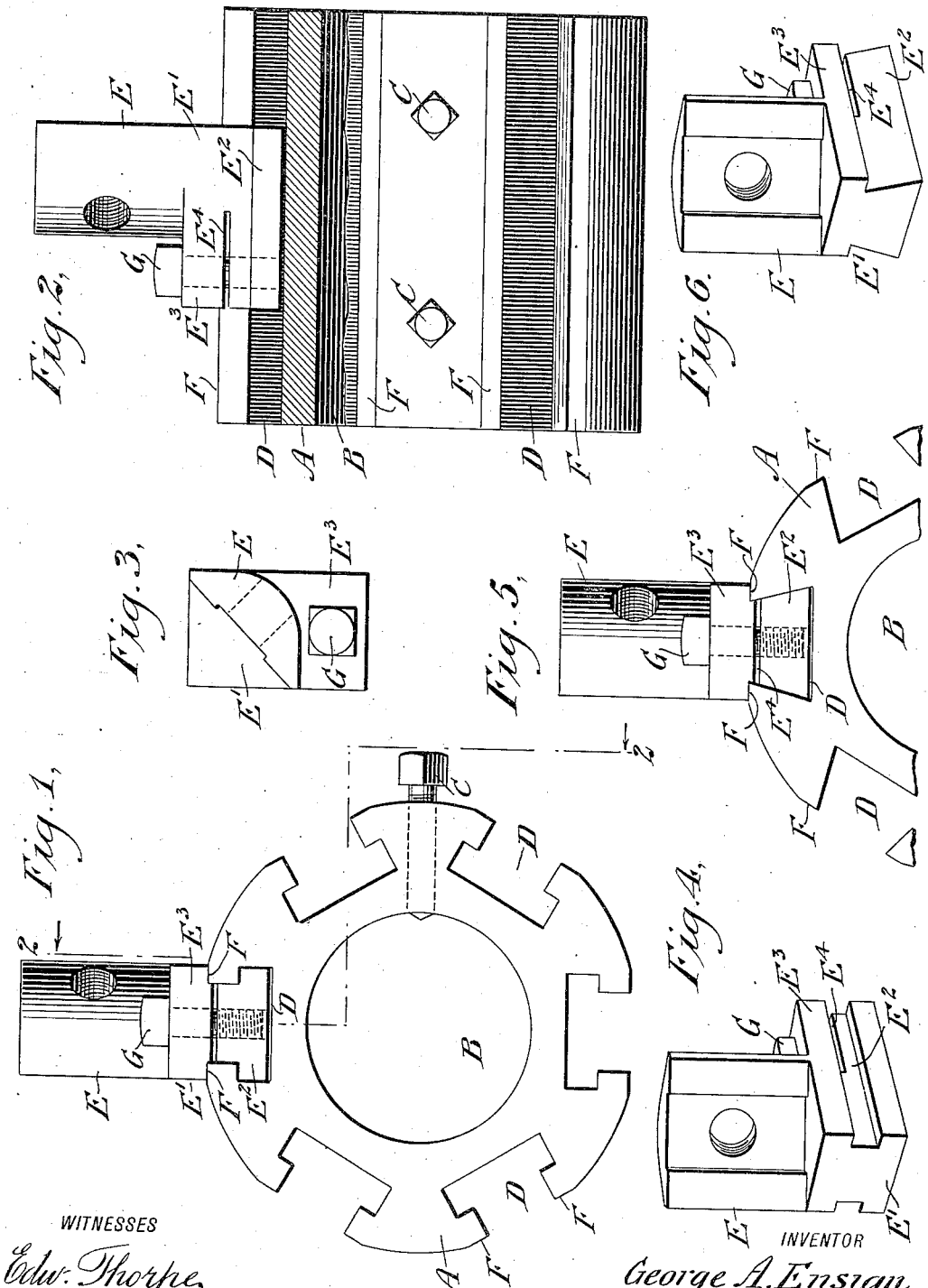

GEORGE A. ENSIGN, OF DEFIANCE, OHIO, ASSIGNOR TO DEFIANCE MACHINE WORKS, OF DEFIANCE, OHIO.

CUTTER-HEAD.

1,072,930.  Specification of Letters Patent.  Patented Sept. 9, 1913.

Application filed May 10, 1913. Serial No. 766,785.

*To all whom it may concern:*

Be it known that I, GEORGE A. ENSIGN, a citizen of the United States, and a resident of Defiance, in the county of Defiance and State of Ohio, have invented a new and Improved Cutter-Head, of which the following is a full, clear, and exact description.

The invention relates to woodworking machinery, and its object is to provide a new and improved cutter head provided with adjustable bit or blade holders, arranged to prevent marring or bruising the cutter head by clamping screws, or as the result of removed clamping screws.

In order to accomplish the desired result, use is made of a hub provided on its peripheral face with a series of undercut grooves extending parallel to the axis of the hub, the bit holders having bases slidingly engaging the said grooves, each base being provided with clamping members, and a set screw engaging the clamping members of a base to draw the clamping members into clamping contact with the walls of the groove.

A practical embodiment of the invention is represented in the accompanying drawings forming a part of this specification, in which similar characters of reference indicate corresponding parts in all the views.

Figure 1 is an elevation of one end of the cutter head with one of the holders in position; Fig. 2 is a side elevation of the same with part in section, on the line 2—2 of Fig. 1; Fig. 3 is a plan view of one of the bit holders; Fig. 4 is a perspective view of the same; Fig. 5 is an elevation of one end of the cutter head provided with an undercut groove in the form of a dovetail; and Fig. 6 is a perspective view of the bit holder for the cutter head shown in Fig. 5.

The hub A of the cutter head is provided with the usual bore B adapted to engage a driving shaft or a spindle to which the hub A is secured by one or more set screws C or other suitable fastening devices. The hub A is provided on its peripheral face with a series of undercut grooves D extending parallel to the axis of the hub A. The undercut grooves D, as shown in Fig. 1, are in the form of T slots, and as shown in Fig. 5 the undercut grooves D are in the form of dovetail grooves, but I do not limit myself to any particular form of undercut groove.

Each of the undercut grooves D is adapted to be engaged by the base $E'$ of a bit or blade holder E, on which the bit or blade is fastened by a screw or other suitable fastening means, and each base $E'$ is formed of a bottom member $E^2$ and a top member $E^3$, of which the bottom member $E^2$ fits into the undercut groove D while the top or outer member $E^3$ fits onto flattened bearing surfaces F arranged on the peripheral face of the hub A adjacent to the sides of the groove D. The base $E'$ is provided with a split $E^4$ extending from one end of the base $E'$ to within a distance of the other end thereof and extending between the top of the member $E^2$ and the bottom of the member $E^3$, and the said members $E^2$, $E^3$ are engaged at the split portions by a screw G for drawing the split portions of the clamping members $E^2$ and $E^3$ toward each other. In doing so the clamping member $E^2$ is drawn into firm contact with the undercut portions of the grooves D, while the other clamping member $E^3$ is drawn into firm contact with the bearing faces F and consequently the base is firmly clamped in position on the hub A, thus holding the bit holder securely in adjusted position.

It is understood that the screw G passes loosely through the top clamping members $E^3$ and screws into the bottom clamping member $E^2$ without moving in contact with the bottom of the corresponding undercut groove D, so that the said bottom is not liable to be marred by contact with the screw as is the case with adjustable bit holders now generally used and fastened in place by set screws.

It will be noticed that by the arrangement described the split portions or clamping members of the base $E'$ provide four contact faces for engagement with the corresponding faces on the hub A, so that the bit holder can be securely fastened in position on the hub A.

It is further understood that when the screw E is partly unscrewed the bit holder can be readily shifted lengthwise on the hub A until the desired position is reached, then the screw G is screwed up to fasten the bit holder in place, as above explained.

It is understood that the bit holder E and its base E' are made from a single piece of metal.

It will also be noticed that by the arrangement described, the hub A is not liable to be unduly strained when mounting a number of bit holders E in place on the hub A.

The split E⁴ and screw G are preferably arranged in the rear of the bit holder E so that the latter extends mainly from the solid portion of the base E'.

The forward face of the bit holder E, onto which the bit or blade is fastened, preferably extends in a plane intersecting the axis of the hub at about an angle of 45° so that the transverse strain incident to cutting the work is mainly on the forward solid or non-split portion of the base E' not on the rear split portion of the base so that the clamping contact of the split base portion with the hub A is not interfered with and the bit holder is not liable to work loose during the use of the cutter head.

Having thus described my invention, I claim as new and desire to secure by Letters Patent:

1. A cutter head, comprising a hub provided on its peripheral face with a series of guideways extending parallel with the axis of the hub, bit holders having bases, each base having an inner clamping member and an outer clamping member, of which the inner clamping member fits into the guideway and the outer clamping member engages the peripheral face of the hub at the sides of the guideway, the said base having a split intermediate the said clamping members, and the latter being integral at the base and a screw engaging the said clamping members to draw the same toward each other, and in engagement with the sides of the guideway and the face of the hub.

2. A cutter head, comprising a hub provided on its peripheral face with an undercut groove, a bit holder having a base provided with integral clamping members and a split extending between the clamping members from one end of the base to within a distance of the other end of the base, one of the clamping members fitting into the said undercut groove and the other clamping member engaging the peripheral face of the hub adjacent the sides of the said groove, and a screw engaging the said clamping members at the split.

3. A cutter head, comprising a hub provided on its peripheral face with an undercut groove extending parallel to the axis of the hub, the peripheral face of the hub adjacent the sides of the said groove being provided with bearing surfaces, a bit holder having a base provided with integral members of which one fits into the said undercut groove and the other engages the said bearing surfaces, the said base being provided with a split extending between the said members and from one end of the base to within a distance of the other end of the base, and a screw engaging the said members at the split.

In testimony whereof I have signed my name to this specification in the presence of two subscribing witnesses.

GEORGE A. ENSIGN.

Witnesses:
GERALD DE VEAUX,
F. E. HALL.

---

Copies of this patent may be obtained for five cents each, by addressing the "Commissioner of Patents, Washington, D. C."